Figure 1:
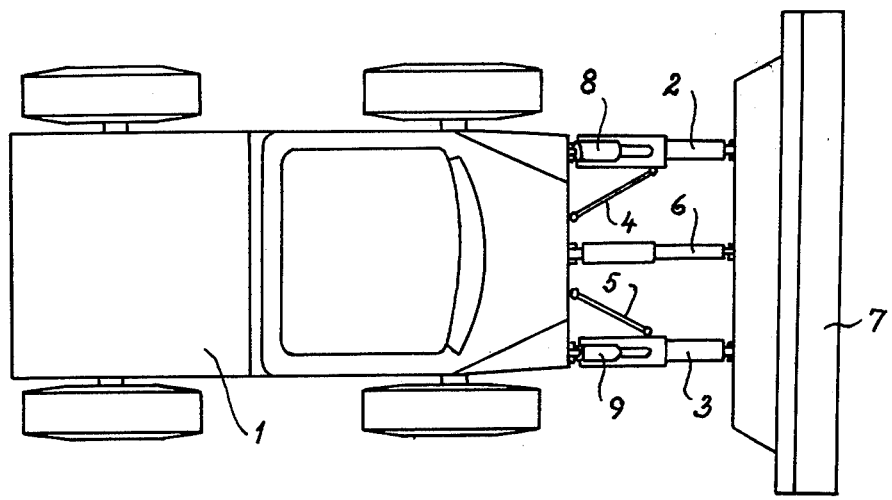

United States Patent [19]

Wiboltt et al.

[11] 4,125,271
[45] Nov. 14, 1978

[54] TOOL SUSPENSION

[75] Inventors: Alfred E. J. J. Wiboltt, Birkerød; Jorgen Rosenberg, Holte, both of Denmark

[73] Assignee: RO-WI Rosenberg & Wilboltt I/S, Birkerød, Denmark

[21] Appl. No.: 700,019

[22] Filed: Jun. 25, 1976

[30] Foreign Application Priority Data

Jun. 11, 1976 [DK] Denmark .............................. 2621/76

[51] Int. Cl.² ............................................... B60D 1/00
[52] U.S. Cl. ................................. 280/461 A; 280/481; 172/449
[58] Field of Search ................... 280/461 A, 481, 479; 172/449

[56] References Cited

U.S. PATENT DOCUMENTS

| 3,158,944 | 12/1964 | Rehberg et al. | 280/481 X |
| 3,201,878 | 8/1965 | Markwardt | 280/481 X |
| 3,432,184 | 3/1969 | Tweedy | 280/481 X |
| 3,572,761 | 3/1971 | Tapp | 280/461 A |

FOREIGN PATENT DOCUMENTS 1,246,969 9/1971 United Kingdom ............... 280/461 A Primary Examiner—John A. Pekar
Attorney, Agent, or Firm—Andrus, Sceales, Starke & Sawall

[57] ABSTRACT

This invention relates to a tool suspension for mounting tools upon either the front or rear of a vehicle in the form of a three-point suspension for hydraulic lifting and lowering. A hydraulic mechanism comprising two mutually independently operable cylinder assemblies each connected to respective lower suspension arms of the three-point suspension. All hinged joints of the suspension being movable in all directions.

4 Claims, 4 Drawing Figures

TOOL SUSPENSION

The present invention relates to a tool suspension for either front or rear mounting of tools from vehicles, in the form of a three-point suspension for hydraulic lifting and lowering. Rear-mounted tools on motor vehicles are used, for example, within the municipal sector for such purposes as road maintenance, snow clearing, street cleaning and grass-cutting.

It is frequently required of a good tool suspension:
1. That it should secure the tool safely and firmly to the vehicle.
2. That it should allow the tool to be lifted clear of the ground.
3. That is should allow the tool during operation to follow the ground freely, independently of the vehicle, so that it will not dig into the ground, should the vehicle sink into a hole.
4. That it should be able to incline tools such as snow ploughs and sweepers by pivotal movement about a vertical axis for ejection of the removed snow and dirt to the right or left of the travelling direction.
5. That it should be able to incline tools such as snow ploughs, snow throwers and scrapers transversely of the travelling direction about a horizontal axis.
6. That in such tools as snow ploughs and plate vibrators it should be able to change inclination of the tool in the travelling direction about a horizontal axis.
7. That it should permit easy mounting and dismounting of the tools.

Heretofore it has been attempted to meet the above requirements by forming the connection of the tool to the vehicle either as a single, sturdy and rigid suspension arm or ycke, or as a double, rigid swing-link suspension, and vertical movement of the tool was accomplished mechanically or hydraulically by means of a central lifting device connected to the suspension arm or the suspension, or two lifting devices coupled in parallel, one on either side. This will satisfy the first three requirements, and if the upper arms of the swing-link suspension are provided with threads, also the sixth requirement can be met.

The other requirements have been satisfied by providing the tools themselves with further facilities of movement, having been constructed to be pivotable per se about horizontal and vertical axes, and including adjustable steadying wheels.

Tools constructed along these lines are complex and therefore expensive, and at the same time the numerous movable parts render the tools vulnerable to collision and involve much maintenance. Furthermore, the tools become heavy, which seriously affects stability of the vehicle, and finally the tools are difficult to mount and slow in adjusting.

The tool suspension according to the invention is distinguished by the feature that the hydraulic mechanism comprises two mutually independently operable cylinder assemblies each connected to respective lower suspension arms of the three-point suspension, all hinged joints of the suspension being movable in all directions.

This makes it possible to satisfy the requirements of items 1, 2, 5 and 7 merely by securing the tool itself directly to the three-point suspension at the free ends of the suspension arms of the latter, after which the tool may be manipulated as stated in items 2 and 5. Requirement 2 is satisfied by both cylinder assemblies operating in parallel in conventional manner, while requirement 5 is satisfied by allowing one cylinder assembly to operate out of alignment with the other. This means that manipulation of the tool into its various working positions is accomplished by means of the hydraulic mechanism of the suspension itself. It will therefore be enough to use simple and consequently inexpensive tools having no separate control or coupling means as the tools are mounted directly on the three-point suspension, after which each tool is readily manipulated at least with the freedom of movement stated in items 2 and 5, being the most significant. Mounting itself is easy and quick, i.a. as it is possible to make allowances for any inclination of the tool relatively to the vehicle, and the tool is safely and firmly connected to the vehicle.

According to the invention, one cylinder assembly may serve as the central hydraulic mechanism of the three-point suspension, while the other cylinder assembly constitutes the connection between the upper and lower suspension arm of one of the co-operating pairs of arms of the three-point suspension.

This embodiment is particularly suitable for use in combination with conventional three-point suspensions as used, for example, on an ordinary tractor for suspending conventional agricultural implements.

The construction according to the invention affords the added possibility of satisfying the requirements of items 3, 4 and 6 without sacrificing any of the advantages stated. By providing a neutral position for the hyraulic mechanism the requirement of item 3 is fulfilled beside those appearing from items 2 and 5. By providing a telescopic construction for the two lower suspension arms of the three-point suspension and operatively connecting the arms to independent drive mechanisms for separate longitudinal adjustment of the arms, the requirements of items 4 and 6 will be fulfilled beside those of items 2 and 5 and possibly 3. The requirement of item 6 may also be satisfied by employing a telescoped construction for the upper suspension arm of the three-point suspension and connecting said upper arm to independently operable drive mechanism for longitudinal adjustment of the arm, which means an added possibility of adjustment. By making all three suspension arms telescopic, the spacing of the tools from the vehicle may be varied so that heavy tools which are not required to pivot about a vertical axis may be brought closer to the vehicle for improved stability and manoeuvrability.

A further advantage of the embodiment of the telescopic suspension arms is that the suspension, for instance by the provision of hydraulic relief valves, may be rendered resilient to collision and other hazards, which safeguards both tool and vehicle.

Figure 2:
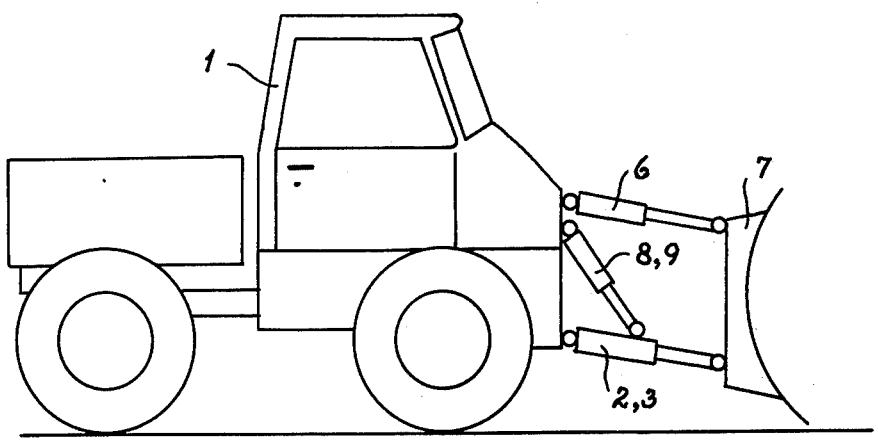
Figure 3:
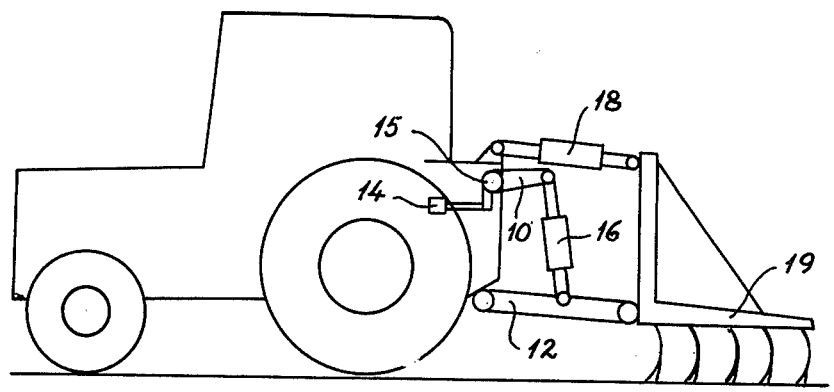
Figure 4:
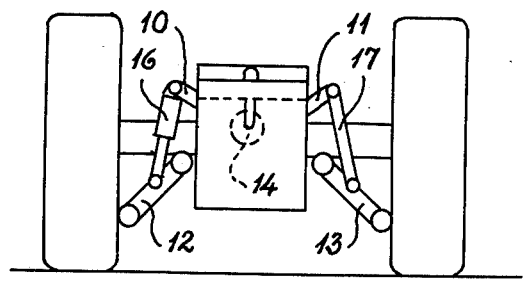

The drawings illustrate a tool suspension according to the invention in that
FIG. 1 is a top view of an embodiment of the suspension mounted on a tractor,
FIG. 2 is a lateral view of same,
FIG. 3 is a lateral view of another embodiment of the suspension mounted on a tractor, and
FIG. 4 is a rear view of same but without tool.

The tool suspension is mounted at the end of a tractor 1 and comprises two independent telescopic lower suspension arms 2 and 3 with associated stabilizer levers 4 and 5 which control lateral movement of the suspension arms, and an upper suspension arm 6, being likewise telescopic.

One end of the suspension arms is secured to the tractor 1 and the other end to the tool 7. All tie-points of the suspension are movable in all directions, being, for example, formed as ball joints.

Each of the lower two suspension arms 2 and 3 is connected to a hydraulic cylinder assembly 8 and 9 which is connected to the suspension arm and the vehicle by means of ball joints.

The cylinder assemblies 8 and 9 are operable independently of each other.

Operation of the telescopic suspension arms 2, 3 and 6 and the lifting cylinders 8 and 9 is effected by means of a hydraulic system which includes a neutral position to release the tool from vertical pressure to ride freely on the ground.

The present example shows a suspension for a front-suspended tool, but the suspension is equally suitable for rear-suspended tools.

In the embodiment shown in FIG. 3 the tractor 1 has a rear-mounted three-point suspension comprising two upper suspension arms 10 and 11, two lower suspension arms 12 and 13, a central hydraulic mechanism 14 for pivoting a transverse shaft 15 to which the suspension arms 10 and 11 are secured, and connecting arms 16 and 17 mounted between co-operating pairs of suspension arms 10 and 12, and 11 and 13 respectively. Of these the arm 16 is formed as a cylinder assembly being independently operable by the central hydraulic mechanism 14. The upper top bar 18 of the three-point suspension is longitudinally adjustable. The tool is designated 19.

What we claim is:

1. A tool suspension for either front or rear mounting of tools from vehicles, comprising a three-point suspension having two lower laterally spaced link type arms hingedly connected at one end of each to the vehicle and at the lower end of each to the tool, an upper intermediate arm hingedly connected at one end to the vehicle and at the other end to the tool, and hydraulic mechanism connected to actuate said lower arms to lift and lower the tool, characterized in that the hydraulic mechanism comprises means to selectively actuate said lower suspension arms independently of each other, means providing a neutral position for said hydraulic mechanism to release the tool from vertical pressure to ride freely upon the ground, and said hinged connections being universally movable.

2. tool suspension as in claim 1, characterised in that said first named means comprises a central hydraulic mechanism connected to each of said lower arms, and a hydraulic cylinder and piston means incorporated in one only of said connections to provide for said independent actuation of said lower arms.

3. tool suspension as in claim 1, characterised in that the two lower suspension arms of the three-point suspension are of telescopic construction, and an independently operable means for longitudinal adjustment of the arm.

4. A tool suspension as in claim 1, characterised in that the upper suspension arm of the three-point suspension is of telescopic construction, and an independently operable means for longitudinal adjustment of said arm.

* * * * *

UNITED STATES PATENT AND TRADEMARK OFFICE
CERTIFICATE OF CORRECTION

PATENT NO. : 4,125,271
DATED : November 14, 1978
INVENTOR(S) : Alfred E. J. J. Wilboltt and Jorgen Rosenberg It is certified that error appears in the above-identified patent and that said Letters Patent are hereby corrected as shown below:

[57] Abstract, Line 7,   After "suspension" insert ---performs the lifting and lowering function---

Column 2, Line 42,   After "to" insert ---an---

Column 4, Line 16   After "2." and before "tool" insert ---A---

Column 4, Line 22   After "3." and before "tool" insert ---A---

Signed and Sealed this

Thirteenth Day of March 1979

[SEAL]

Attest:

RUTH C. MASON
Attesting Officer

DONALD W. BANNER
Commissioner of Patents and Trademarks